United States Patent [19]

King

[11] 4,202,754

[45] May 13, 1980

[54] COMBINATION ELECTROLYTIC AND ELECTROSTATIC TREATER

[76] Inventor: Arthur S. King, 8021 Cherokee La., Leawood, Kans. 66206

[21] Appl. No.: 972,676

[22] Filed: Dec. 26, 1978

[51] Int. Cl.² ............................................. C25B 9/00
[52] U.S. Cl. .................................... 204/272; 204/275
[58] Field of Search ............... 204/302, 299, 263, 269, 204/260, 272, 257, 275

[56] References Cited

U.S. PATENT DOCUMENTS

| | | | |
|---|---|---|---|
| 3,801,492 | 4/1974 | King | 204/302 |
| 3,896,022 | 7/1975 | Childs | 204/302 |
| 3,936,376 | 2/1976 | Centineo | 204/302 |

Primary Examiner—R. L. Andrews
Attorney, Agent, or Firm—Schmidt, Johnson, Hovey & Williams

[57] ABSTRACT

The treater has a pair of separate treating chambers, each of which is provided with a pair of oppositely charged electrodes. One electrode in each chamber is bare while the other is electrically insulated from electrolyte contained within the chamber so that while an electric field is established between electrodes of the same chamber, no electrical current flow moves therebetween. Additionally, the two chambers are coupled in flow communication with one another and the two bare electrodes are oppositely electrically charged so as to establish an electrolytic action between the two bare electrodes, hence simultaneously exposing electrolyte of the chambers to both electrostatic and electrolytic action to promote flocculation and coagulation of hydrated solids contained in the electrolyte.

4 Claims, 1 Drawing Figure

U.S. Patent May 13, 1980 4,202,754
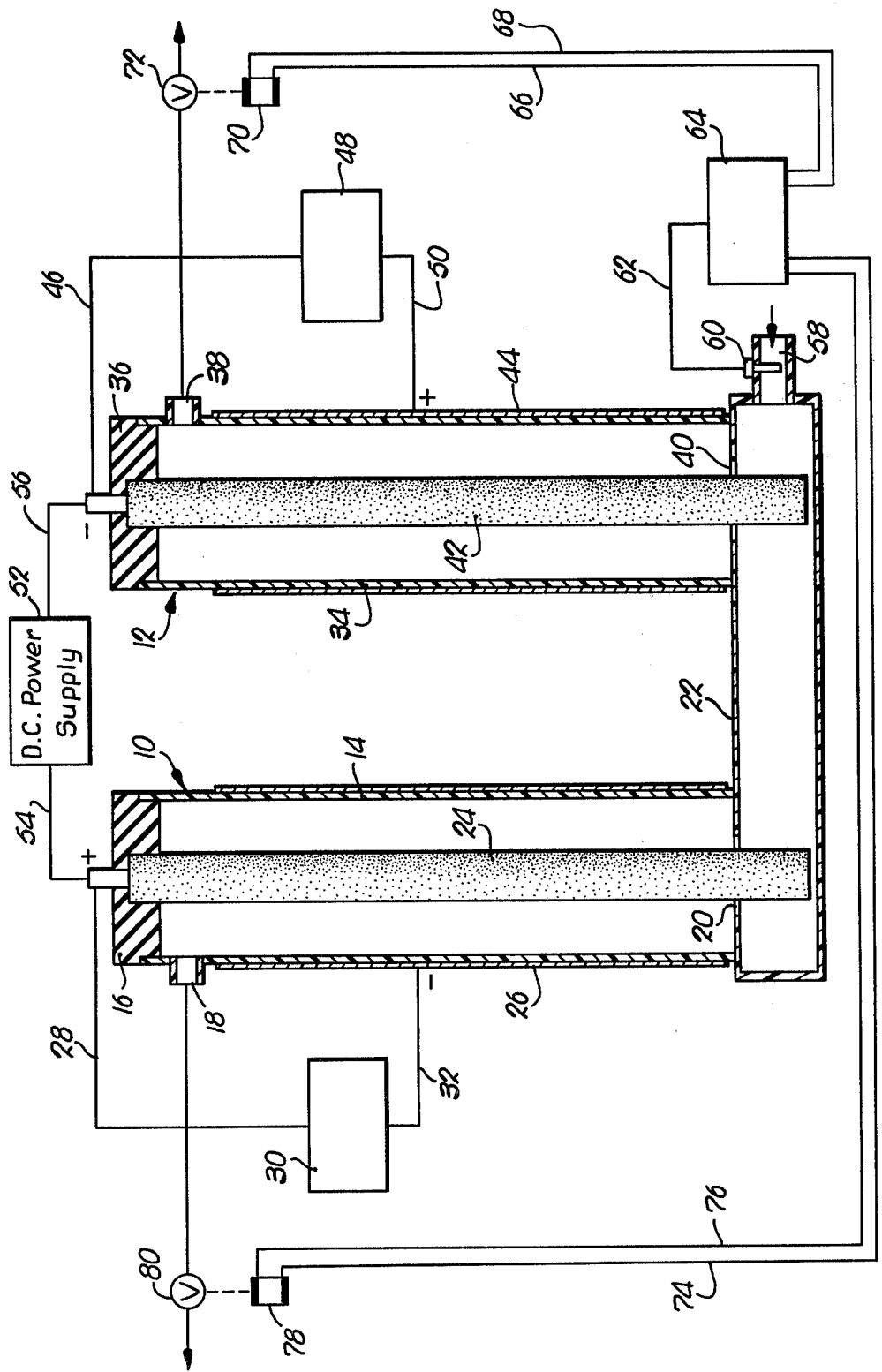

COMBINATION ELECTROLYTIC AND ELECTROSTATIC TREATER

TECHNICAL FIELD

This invention relates to the field of fluid treatment by electrodic action such as, for example, waste water treatment by electrical means to encourage flocculation, coagulation and eventual precipitation of hydrated solids contained in such waste water.

BACKGROUND ART

It can be said that hydrated solids in waste waters resist combination with other ionic particles so as to stabilize the suspension because of at least two major factors. First, each hydrated ion is surrounded by a cluster of water molecules forming a protective physical shell or barrier around the ion so as to prevent its direct contact and marriage with other ions. Secondly, the polar water molecules surrounding the ions establish what can be termed an electrical double layer that produces electrical potentials acting as barriers to the close approach of other particles.

I have found as disclosed in several of my prior patents that by exposing the suspension to an electric field without electrical current flow, the polar water molecules tend to align themselves and to thereby lose their affinity for the ions which they encircle, hence making it easier for the ions to come into physical contact with one another and unite so as to cuase the formation of floc.

It has also been pointed out in my prior patents that when an electrostatic treater of this type is utilized upstream from an electrolytic treater such that the waste water being treated is exposed first to the electrostatic treater and thence to the electrolytic treater, coagulation and flocculation is further promoted without causing plating out of materials on the electrodes of the electrolytic treater.

SUMMARY OF THE INVENTION

It has now been discovered that a still greater flocculating action can be obtained if the waste water being treated is exposed simultaneously to electrostatic and electrolytic action. In this regard, during electrolytic action, the hydrated ions must move to an electrode and come into direct physical contact with the same in order to give rise to electronation, i.e., the giving up or accepting of an electron resulting in reduction or oxidation. Once having been electronated at the electrode, the ion must move away from the same.

Inasmuch as the electrode surface is covered by a layer of water molecules, and further remembering that the hydrated ions are surrounded by protective shells of water molecules, there is a built-in resistance to the ions coming into direct physical contact with the electrode. On the other hand, it is believed that, if the electrode which the hydrated ions are attempting to approach forms part of an electrostatic treater in addition to its electrolytic function, not only do the water molecules surrounding the ions become aligned, but also those water molecules encasing the electrode become aligned, making it that much easier for the ions to move into direct physical contact with the electrode.

BRIEF DESCRIPTION OF THE DRAWING

The single FIGURE of the drawing is a schematic representation of a treater system having combined electrostatic and electrolytic characteristics in accordance with the principles of the present invention.

DETAILED DESCRIPTION

The treater of the drawing includes a pair of separate chambers 10 and 12 of cross-sectionally cylindrical configuration and normally disposed in upright dispositions. The chamber 10 includes a continuous annular wall 14 constructed from a suitable dielectric material, the otherwise open upper end of the chamber 10 being closed by an electrically insulative plug 16. An outlet 18 adjacent the plug 16 leads liquid away from the interior of the chamber 10, while ingress to the latter is afforded by an outlet 20 in a conduit or manifold 22 across the lower, otherwise open end of the chamber 10.

An electrode 24 is concentrically suspended within the chamber 10 by the plug 16 and extends for the full length of the chamber 10 and downwardly beyond the latter through the outlet 20 and into the conduit 22. The diameter of the electrode 24 is slightly less than the diameter of the outlet 20 of conduit 22 for a reason which will hereinafter be explained. The electrode 24 is preferably constructed of a carbonaceous material and is bare so as to be fully exposed in direct physical contact with any liquid contained within the chamber 10.

An outer electrode 26 such as in the nature of metal foil is wrapped around the outside of the wall 14 in concentric relationship with the chamber 10 and the inner electrode 24. As a result of the dielectric nature of the wall 14, the inner electrode 24 and the outer electrode 26 are electrically insulated from one another. A lead 28 connected to the upper end of the electrode 24 leads to one side of a source of direct electrical potential 30, while another lead 32 from the source of potential 30 is connected to the outer electrode 26, it being contemplated that the inner electrode 24 will be connected to the positive side of the source 30 and thus positively charged, while the outer electrode 26 will be connected to the negative side of the source 30 and thus negatively charged.

The chamber 12 and its associated components are virtually identical to the chamber 10 and its components. To this end, the chamber 12 is cylindrical in cross-section, having a continuous annular wall 34 of dielectric material that has its otherwise open upper end closed by a dielectrice plug 36. An outlet 38 for discharging liquid from the chamber 12 is located adjacent the plug 36, and ingress into the chamber 12 is provided via an outlet 40 of the conduit 22, such outlet 40 being in axially registration with the longitudinal axis of the chamber 12.

An inner electrode 42 is suspended within the chamber 12 by the plug 36 in concentric relationship with the wall 34, the electrode 42 extending the full length of the wall 34 and downwardly beyond the latter through the outlet 40 and into the conduit 22. The diameter of the outlet 40 is enlarged with respect to that of the electrode 42. As in the case with the electrode 24 of chamber 10, the electrode 42 is preferably constructed from a carbonaceous material.

An outer electrode 44, preferably in the nature of a metal foil, is wrapped around the wall 34 in concentric relationship with the latter and with the inner electrode 42. As a result of the dielectric nature of the wall 34, the inner electrode 42 and the outer electrode 44 are electrically insulated from one another. A lead 46 from the upper end of the inner electrode 42 connects the latter to one side of a source 48 of direct electrical potential, while another lead 50 joins the source 48 with the outer electrode 44. Preferably, the lead 46 is connected to the negative side of the source 48 such that the inner electrode 42 will be negatively charged, while the lead 50 is connected to the positive side of the source 48 so that the outer electrode 44 will be positively charged.

By virtue of the above construction, it is apparent that each of the chambers 10 and 12 is provided with its own electrostatic treating arrangement which may be used to act upon waste water circulated through the system. Additionally, it will be recognized that when the chambers 10 and 12 as well as the conduit 22, are supplied with an electrolyte, an electrolytic action can be obtained between the oppositely charged, bare electrodes 24 and 42. The electrical current flow between the bare electrodes 24 and 42 may, however, not be of the magnitude desired, and thus it is contemplated that a relatively low voltage but high amperage source of electrical potential 52 may be applied across the electrodes 24 and 42 via the leads 54 and 56 connected to the electrodes 24 and 42 respectively.

The conduit 22 is provided with an inlet 58 leading from a source of waste water having electrolyte properties. If desired, a pH sensor 60 may be utilized in connection with the inlet 58 such as to detect the pH level of incoming waste water, and the signal from the sensor 60 may be transmitted via a lead 62 to a control device 64. In turn, the device 64 may send an electrical signal via the circuit leads 66 and 68 to a solenoid 70 for opening or closing a valve 72 at the outlet 38.

Likewise, the device 64 may be utilized to send an electrical signal via the circuit leads 74 and 76 to a solenoid 78 that operates a valve 80 for opening and closing the outlet 18.

Waste water is introduced into the treater via the inlet 58, from thence it moves throughout the conduit 22 and upwardly through its outlets 20, 40 into the chambers 10 and 12. If the incoming waste water contains predominately positively charged ions, it may be desirable to close down the outlet 18 so that most, if not all, of the flow is through chamber 12 and its outlet 38, it being necessary in that instance, however, to maintain the chamber 10 full of liquid so that the electrolytic action between the oppositely charged electrodes 24 and 42 will not be destroyed. By virtue of this technique, ions which have been electronated by contact with the negatively charged electrode 42 are by and large prevented from being exposed to the positively charged electrode 24, and thus, once so electronated, have little tendency to revert back to their pre-electronated state.

If desired, the pH sensor 60 may be employed to detect the predominent pH of the waste water entering the conduit 22 and hence its predominance of positive or negative charges, whereupon the outlets 18 and 38 may be automatically controlled via the device 64, the solenoids 70, 78 and the valves 72, 80.

As a result of the fact that in each of the chambers 10, 12 an electrostatic action is going on between the respective electrode 24, 26 and 42, 44, the clusters of water molecules around the various ionic particles within the electrolyte become aligned in the resulting electric field so as to reduce the repelling effect of the hydrated ion for its neighboring hydrated ions. Thus, there is a greater likelihood that the ions will physically contact one another and "marry" so as to form floc.

Additionally, resistance to the ion particles contacting the respective electrodes 24 or 42 so as to change such ion particles electrically and promote their marriage with other particles is substantially reduced because the water molecules in the sheaths surrounding the electrodes 24 and 42 are likewise aligned in the electric field. This reduces their repulsive effect against the ion particles, permitting the latter to more readily come into contact with the electrode services 24 or 42, thereby ultimately increasing the willingness of the ion particles to combine with one another.

I claim:

1. A combination electrostatic and electrolytic treater for use in treating an electrolyte, said treater comprising:

a pair of separate chambers;

a pair of oppositely charged electrodes associated with each of said chambers respectively;

means electrically insulating one electrode of each chamber from the other electrode of the same chamber so that, as between electrodes of the same chamber, there can be no electrical current flow when an electrolyte is present therebetween; and means for electrically connecting electrolyte in one of said chambers with electrolyte in the other, the other electrode of each chamber being bare for direct physical contact with electrolyte contained within the corresponding chamber and said other electrodes being charged electrically oppositely of one another whereby to establish an electrical current flow between said other electrodes via said connecting means when electrolyte is present and to encourage coagulation and flocculation of hydrated solids within the electrolyte.

2. A treater as claimed in claim 1, wherein said conduit is provided with an inlet for receiving electrolyte from a source thereof and with a pair of outlets leading to respective ones of said chambers.

3. A treater as claimed in claim 1, wherein said connecting means includes a conduit coupling said chambers in flow communication with one another.

4. A treater as claimed in claim 1, wherein each of said chambers is of generally cylindrical configuration and is disposed in a normally upright disposition, said other electrode of each chamber being arranged concentrically within the corresponding chamber and said one electrode of each chamber being arranged concentrically around the outside of the corresponding chamber.

* * * * *